United States Patent [19]

Behrens et al.

[11] Patent Number: 4,665,647
[45] Date of Patent: May 19, 1987

[54] PLANT BEARING NOISE ABATEMENT WALL

[76] Inventors: Wolfgang Behrens, Annen Nr. 2, D-2833 Gross Ippener; Bernd Krupka, Heisterkamp 21, D-3167 Burgdorf OT Heessel, both of Fed. Rep. of Germany

[21] Appl. No.: 777,698
[22] PCT Filed: Jan. 23, 1985
[86] PCT No.: PCT/DE85/00019
 § 371 Date: Sep. 13, 1985
 § 102(e) Date: Sep. 13, 1985
[87] PCT Pub. No.: WO85/03317
 PCT Pub. Date: Aug. 1, 1985

[30] Foreign Application Priority Data

Jan. 26, 1984 [DE] Fed. Rep. of Germany ....... 3402531

[51] Int. Cl.$^4$ .......................... A01G 1/00; A01C 1/04; E01F 8/00
[52] U.S. Cl. ............................................ 47/33; 47/83; 256/19
[58] Field of Search ................. 47/32, 33, 82, 83, 86; 256/12.5, 19; 405/273

[56] References Cited

U.S. PATENT DOCUMENTS

| 2,113,523 | 4/1938 | White | 47/33 |
| 2,121,173 | 6/1938 | MacPherson | 47/33 |
| 2,279,735 | 4/1942 | Gates | 47/33 |
| 3,992,812 | 11/1976 | Horowitz | 47/33 |

FOREIGN PATENT DOCUMENTS

| 100911 | 4/1898 | Fed. Rep. of Germany | 47/33 |
| 2636917 | 2/1978 | Fed. Rep. of Germany | 47/82 |
| 2733428 | 2/1979 | Fed. Rep. of Germany | 47/83 |
| 2848713 | 5/1980 | Fed. Rep. of Germany | 47/33 |
| 2920700 | 8/1980 | Fed. Rep. of Germany | 47/83 |
| 3025692 | 1/1982 | Fed. Rep. of Germany | 47/83 |
| 3027442 | 2/1982 | Fed. Rep. of Germany | 256/19 |
| 2253451 | 8/1975 | France | 47/83 |
| 2444119 | 12/1978 | France | 47/33 |
| WO84/01791 | 5/1984 | PCT Int'l Appl. | 47/83 |

*Primary Examiner*—James R. Feyrer
*Attorney, Agent, or Firm*—Collard, Roe & Galgano

[57] ABSTRACT

Dry lawn construction wherein the internal space formed by the lateral vegetation mats (28, 30) is self-ballasted with a self-supporting substrate (12) which is rendered stable by checking or compaction and used as a nutrient medium for growing plants from the vegetation mats. The supports and auxiliary technical constructions are thus simplified. Furthermore, it is possible to set the plant bearing wall even in locations which are extremely arid since the substrate and the vegetal growth form a self-maintaining system.

14 Claims, 3 Drawing Figures

PLANT BEARING NOISE ABATEMENT WALL

The invention relates to a plant bearing wall having lateral walls and a filling disposed between said walls, and in particular a plant bearing wall having noise abatement properties.

Constructions with plant formations exist. Their importance is growing as the general awareness of environmental quality increases because the aesthetic appearance of the outside walls of constructions or concrete bricks—which are increasingly used for the demarcation of land areas and also for securing slopes—is frequently spoiled by such constructive elements.

It is known from DE-PS 29 00 700 to arrange on the visible surface of concrete bricks a facing consisting of a porous, coarsely structured and biologically active material. This facing permits on the visible surface of the concrete bricks a natural life of flora and fauna, so that the surface no longer has a concrete-like appearance, but rather a pleasant aesthetic effect due to such biological greenery. However, such a facing permits only the growth of moss, since no lawn or plants can form.

A construction with living plants to be used as a sound-insulating wall is described in DE-OS 30 27 442. With this known construction, two lateral walls disposed with a spacing in between are designed as lawn mats forming an interior space filled with soil in order to maintain the growth of plants.

In most cases, constructions with living plants are found in arid locations because the selection of the location is not based on optimal biological aspects, as it is the case, for example with a noise abating wall, but rather on artifically created conditions (e.g. the course of a roadway). This means that the supply of water for the growth of plants on such constructions poses a great problem which, until now, could be solved only by additional measures such as, for example irrigation. Such measures, however, require additional expenditure.

Another serious drawback of known constructions is the aspect of mechanical stability. The loose soil contained in the interior space formed by the lawn mats on both sides causes considerable pressure to be applied to the lateral lawn mats. Therefore, for stability reasons, costly mechanical auxiliaries are required in order to handle the pressure.

Due to the constant pressure to which the lawn mats are subjected, such mats may break open or tear and such damage will cause the filling soil to trickle through the opening, which then requires expensive repair.

Futhermore, there is the danger that the construction or filling soil may be undermined or hollowed out by animals, for example rats, with the result that the construction may cave in.

Therefore, in order to assure mechanical stability, which is absolutely required, the lawn mats of known construction are provided with special steel rod or bar grates in order to maintain the lawn mats in a stable condition. In addition, the steel bar grates must be connected with each other by means of anchors extending through the filling soil in order to prevent the grates from yielding to the pressure of the soil. Such auxiliary mechanical constructions for achieving the desired stability are costly and significantly contribute to construction costs. Also, there is the hazard that such mechanical elements will corrode due to thawing salt spray mist.

The problem of mechanical stability does not exist with the afore-mentioned concrete bricks according to DE-PS 29 00 700. However, the manufacture of such a concrete brick or slab is expensive, apart from the fact that only a moss covering is possible due to the lack of soil.

The object of the present invention is to provide a construction which can be called a plant bearing noise abatement wall, which requires only a minimum of auxiliary mechanical means for the required stability and which, furthermore, is completely independent of the water supply situation.

This object is accomplished according to the present invention by providing the filling between the walls of the plant bearing wall in the form of a self-supporting, stable substrate representing a nutrient medium for vegetation, and by providing the lateral walls in the form of vegetation mats.

An important feature of the present invention is the substrate which, in a novel manner, is designed as a self-supporting, stable substrate, i.e., a substrate which is stable by itself. This is a surprising measure in that it is contrary to horticultural knowledge to date since, with a nutrient medium, it has always been felt that such a nutrient medium or substrate for plants or the like should be kept as loosely heaped as possible.

Contrary to the above, with the present invention, the substrate filled in the interior space between the lateral walls is compacted by stamping or shaking by means of a vibrator, with the result that an adhesive bond between the granular components of the substrate is obtained, thereby rendering the substrate stable and self-supporting. Such an adhesive bond and thus stability of the substrate are especially advantageous if, according to another useful feature of the invention, modified trass-lime plaster is added to the substrate.

Because of the stable substrate, a quasi biological armoring and resistance to erosion is achieved, with the result that the afore-mentioned auxiliaries may be designed much simpler and less comprehensive than heretofore in order to achieve overall mechanical stability of the plant bearing wall construction. Owing to the self-reinforcing and stable substrate, the lateral walls are no longer subjected to any significant pressure, so that an anchoring connection between the lateral walls may be omitted.

Another advantage of the stable substrate is that if the plant bearing wall construction is damaged due to the destruction of the lateral vegetation mats, trickling out of the substrate is prevented.

Furthermore, another favorable feature is that due to the fact that the plant bearing wall construction is solidified and contains stone, it is very difficult for animals, for example rats, to undermine or hollow out the construction, thereby reducing the hazard of a cave-in.

The substrate so compacted by stamping or shaking can be practically referred to as a substrate block, with the surprising result that said block can be nevertheless provided with vegetation. In order to permit such vegetation, the substrate, as a useful further refinement of the invention, contains lava, sand, a swelling clay, lime gravel and basalt. Advantageous is the addition of clay, bark humus and soluble lean clay.

Jointly with the lateral vegetation mats, a self-regulating, technico-biological system is obtained, with a permanent capability of survival and development of the vegetation even in arid locations.

Thus, the novel type of dry lawn construction can be usefully set up on roadways as a noise abatement wall. If used for this purpose, thawing salt mist, which occurs in the winter from the spraying of thawing salt and which has a toxic effect on soil, will not be a problem. With the present invention, the toxic effect of the thawing salt is buffered by another useful feature of the invention, according to which feature crude humus components (bark humus) is added to the substrate (about 15% by volume).

Because of the plant bearing noise abatement wall according to the invention, the space on which such antinoise walls are set up can be reduced to small dimensions, for example to about 1 meter, while maintaining the optimal effect of protection against noise of a body of soil. The technical supporting and auxiliary constructions, which are not completely omitted with the present invention, but which may have a much simpler design, can be almost completely covered by the vegetation on the vegetation mats, so that an aesthetic appearance is created. The problem of an extremely lean water supply situation is solved by the afore-mentioned way of vegetation-technological adaptation between the substrate and the plants of the vegetation mats. Thus owing to the special substrate, it is possible to create a self-maintaining vegetation cover permitting the growth of moss, grass, herbs and short wooded plants. Since the plant bearing wall is self-maintaining, no care and maintenance (watering, fertilizing, cutting or trimming) are required, which is another advantage of this construction.

According to another useful feature of the invention, the lateral vegetation mats have outwardly directed bucklings, which enlarge the surface of the plant bearing wall. If great amounts of water are collected due to rainfall or heavy showers, these bucklings retard the drainage of water, which prevents damage to the wall. Furthermore, more water can seep into the lateral wall instead of being drained unused. The substrate mixture used with the invention is hygroscopic, i.e., even the moisture in the air can be absorbed and made available to the plants. In this connection, the enlarge surface as a result of the bucklings has the positive effect that more water can be absorbed due to said enlargement. Finally, said bucklings or round projections have visual advantages in that the surface is not monotonous.

The invention is explained in the following in greater detail with the help of the embodiment shown in the drawing, in which.

Figure 1:
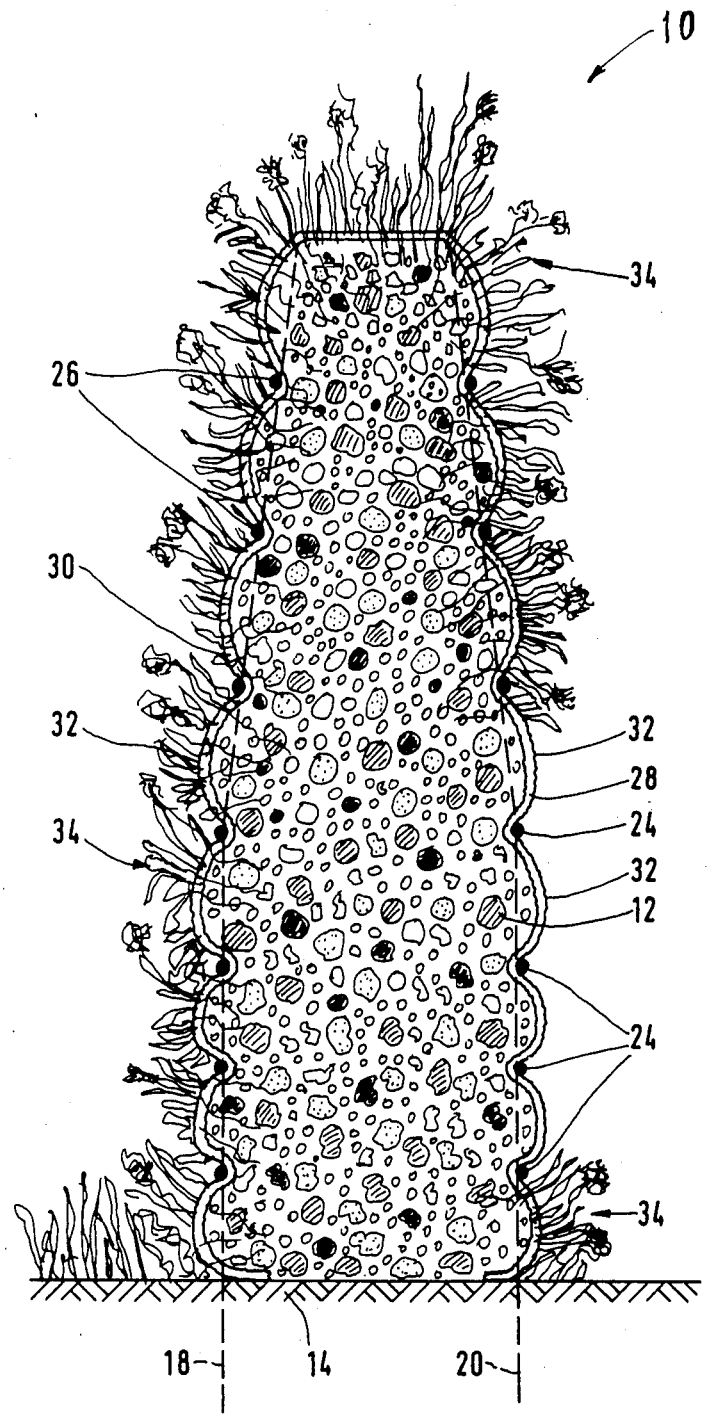
FIG. 1 is a cross-sectional view of the plant bearing noise abatement wall.

The plant bearing wall 10 shown in the drawing, which can be advantageously used as a wall protecting against noise, is comprised of a substrate 12 with two vegetation mats 28 and 30 forming the lateral walls of the wall 10. As a mechanical supporting or auxiliary construction, supporting elements 16 are provided and arranged with a spacing between each other, said supporting elements having the lateral supporting arms 18 and 20. Within the top zone of the plant bearing wall 10, said supporting arms have a roof-like design, so that the wall 10 is tapered upwardly.

The supporting elements 16 are supported in the foundations 22 which are installed in ground 14.

Several slightly sagging ropes arranged with a spacing between each other extend on the two outer sides between supporting elements 16 or lateral supporting arms 18 and 20. The inner space formed by said ropes 24 and 26 of the plant bearing wall 10 is provided with vegetation mats 28 and 30, which are placed against ropes 24 and 26 from the inside, and this interior space is subsequently filled with the substrate 12.

Figure 2:
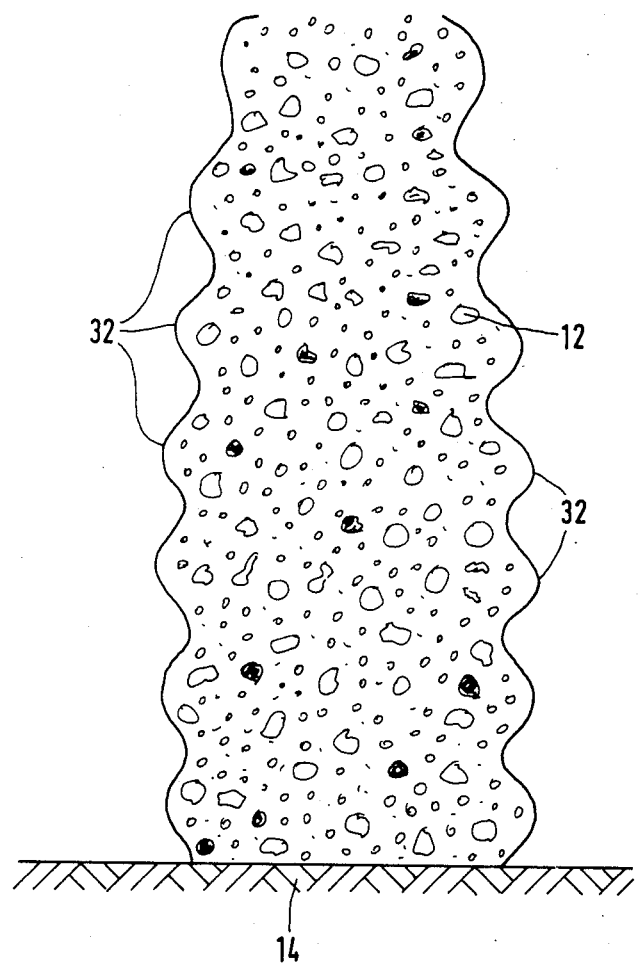
FIG. 2 is a cross-sectional view of the loaded substrate.
Figure 3:
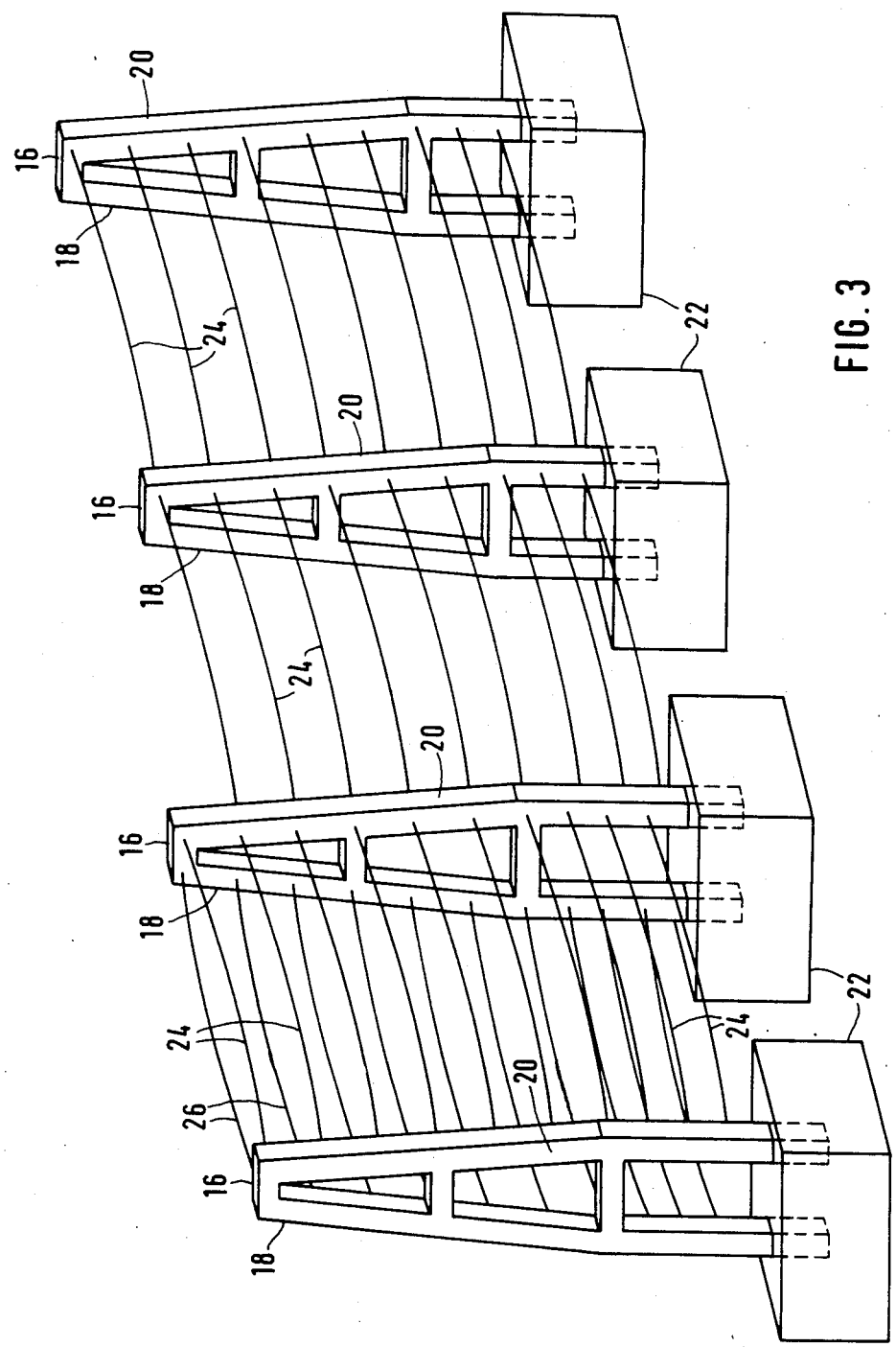
FIG. 3 is a perspective view of the principle of a mechanical auxiliary construction for the plant bearing wall.

The cross-sectional view according to FIG. 1 shows that outward bucklings are formed in vegetation mats 28 and 30 between the individual ropes 24 and 26, leading to an enlargement of the surface of the plant bearing wall 10. The substrate filling the interior space formed by vegetation mats 28 and 30 is compacted by stamping or shaking, with the result that a stable, self-supporting substrate is formed, which, according to the cross-sectional view shown in FIG. 2, forms a stable substrate block. Thus, only in the course of compacting, pressure is briefly applied to the lateral vegetation mats 28 and 30, whereas after the compacting of the substrate block, the latter by itself is a stable, self-supporting element, so that after compacting, no more pressure is applied to lateral vegetation mats 28 and 30.

In spite of said compacting, which is carried out against the commonly held opinion that a substrate or medium for plant growth should be maintained as loosely heaped as possible, substrate 12 is suitable as a nutrient medium for vegetation mats 28 and 30 or plant growth 34 of said vegetation mats.

Vegetation mats 28 and 30 may be prefabricated vegetation mats provided with plant growth 34. Plants 34 may be moss, grass, herbs and short wooded plants. In the course of time, the plants drive their roots into substrate 12, thereby leading to additional mechanical stability due to biological armoring or reinforcement. This further increases the stability of substrate 12, which is actually already stable per se.

The mechanically stable property of substrate 12 due to compacting or shaking can be achieved with particularly advantageous results if a modified trass-lime mortar is mixed with the substrate. This promotes an adhesive bond between the granular components of substrate 12.

Said modified trass-lime mortar is a mortar which, in the dry state, was blended with about 10% by volume bentonite meal and 5% by volume Portland cement. A particularly suitable mixture of substrate 12 has the following composition:

| | |
|---|---|
| Oolite and dolomite gravel, 0–45 mm | 30% by volume |
| Lava or slag, 0–65 mm | 20% by volume |
| Clay | 5% by volume |
| Soluble loam (B- or C-stratum) | 20% by volume |
| Bark humus | 15% by volume |
| Modified trass-lime mortar | 10% by volume |
| | 100% by volume |

Substrate 12 is hygroscopic, so that even the moisture in the air can be absorbed and made available for the plants. The substrate 12 in combination with the plant growth 34 represents a self-regulating biotechnological system with durable capability of survival and development of the vegetation on the vegetation mats 28 and 30, permitting a vegetation even in extreme locations. The use of modified trass-lime mortar needs to be stressed, among other features, which significantly contributes to the hygroscopic property. Normally, in horticultural technology, mortar is considered a toxin for plants, yet the present invention is based on the finding that the addition of modified trass-lime mortar to the substrate 12 has, in a surprising way, an advantageous effect.

As stated hereinabove, the vegetation-technological harmonization between the substrate 12 and the vegetation mats 28 and 30 permits also the growth of moss. In this connection, an advantage to be stressed is that the layer of moss is capable of absorbing the moisture in the air and pass the same one to the substrate 12, where it is absorbed by the trass-lime mortar component of the mixture.

Another advantage is that the stone components in the substrate 12 are fully coated with humus. Surprisingly, it was found that the stone components in the mixture are coated with humus due to the mixing process. This results in a uniform distribution of the humus substance and, furthermore, the capillary effect is significantly enhanced.

All in all, by virtue of the present invention, a plant bearing wall is provided which can be used with optimal results as a wall protecting against noise. This wall construction may be used in arid locations where the supply of water is extremely low. Plant bearing wall 10 is completely maintenance-free because the substrate 12 jointly with the vegetation mats 28 and 30 or plant growth 34 forms a self-maintaining system. Because substrate 12 is rendered self-supporting by compacting or adhesive bonding, the technical support and auxiliary constructions may be limited to a few elements.

What is claimed is:

1. A static, vertically extending plant growth and noise abatement structure which is taller than it is wide, the structure including:
   at least two spaced-apart, static, generally A-shaped support means;
   anchor means for said static support means;
   a plurality of flexible support means interconnecting parallel legs of said static support means;
   flexible vegetative mat means adpressed against the inside surfaces of said flexible support means to define two generally upwardly extending sides; and
   a structurally stable, self-supporting non-phytotoxic substrate mixture contained between said sides, said mixture including at least one porous aggregate material, at least one filler material, at least one hygroscopic material, and at least one binding material, whereby the structure may be installed by compacting the substrate mixture between said sides to serve as a medium for plants to be grown.

2. The structure as defined in claim 1, wherein said substrate mixture includes a nutrient medium for said plant growth.

3. The structure as defined in claim 1, wherein the sides of said structure taper upwardly and inwardly toward the center thereof.

4. The structure as defined in claim 1, wherein said substrate mixture includes 30% by volume 0–45 mm oölite and dolomite gravel, 20% by volume 0–65 mm. lava or slag, 5% by volume clay, 20% by volume soluble loam B- or C-stratum, 15% by volume bark humus, and 10% by volume modified trass-lime mortar.

5. The structure as defined in claim 1, wherein said static, generally A-shaped support means are formed of synthetic resin concrete.

6. The structure as defined in claim 1, wherein said substrate mixture includes lava, sand, a swelling clay, lime gravel and basalt.

7. The structure as defined in claim 6, wherein the lava and lime gravel components of said substrate mixture are coated with bark humus.

8. The structure as defined in claim 1, wherein said flexible support means comprises a plurality of parallel ropes stretched between said static support means.

9. The structure as defined in claim 8, wherein said flexible vegetative mat means have outwardly directed buckling between adjacent ropes thereby enlarging the surface of structure.

10. The structure as defined in claim 1, wherein said at least one hygroscopic material includes modified mortar.

11. The structure as defined in claim 10, wherein said modified mortar is a modified trass-lime mortar with bentonite as an aggregate.

12. The structure as defined in claim 11, wherein the amount of modified trass-lime mortar in said substrate is from 8 to 10% by volume.

13. The structure as defined in claim 12, wherein said modified trass-lime mortar is blended in the dry state with about 10% by volume betonite meal and about 5% by volume Portland cement.

14. The structure as defined in claim 12, wherein said substrate includes about 15% by volume bark humus.

* * * * *